(12) United States Patent
Jeong

(10) Patent No.: US 9,067,475 B1
(45) Date of Patent: Jun. 30, 2015

(54) METHOD AND SYSTEM OF HEATING CABIN OF HYBRID ELECTRIC VEHICLE

(71) Applicants: Hyundai Motor Company, Seoul (KR); Kia Motors Corporation, Seoul (KR)

(72) Inventor: Won-Young Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/299,469

(22) Filed: Jun. 9, 2014

(30) Foreign Application Priority Data

Dec. 5, 2013 (KR) .................. 10-2013-0150696

(51) Int. Cl.
- *B60H 1/00* (2006.01)
- *H05B 1/02* (2006.01)
- *G05B 15/02* (2006.01)
- *G05D 23/19* (2006.01)
- *B60H 1/04* (2006.01)
- *B60L 11/18* (2006.01)

(52) U.S. Cl.
CPC .......... *B60H 1/00878* (2013.01); *H05B 1/0236* (2013.01); *G05B 15/02* (2013.01); *G05D 23/19* (2013.01); *B60H 1/04* (2013.01); *B60L 11/1851* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 6,009,369 | A * | 12/1999 | Boisvert et al. | 701/99 |
| 8,209,073 | B2 * | 6/2012 | Wijaya et al. | 701/22 |
| 8,448,696 | B2 * | 5/2013 | Johnston et al. | 165/104.32 |
| 8,489,267 | B1 * | 7/2013 | Lombardo et al. | 701/22 |
| 2010/0089547 | A1 * | 4/2010 | King et al. | 165/42 |
| 2012/0180997 | A1 * | 7/2012 | Johnston et al. | 165/104.32 |
| 2014/0109872 | A1 * | 4/2014 | Porras et al. | 123/435 |
| 2014/0114515 | A1 * | 4/2014 | Porras et al. | 701/22 |

FOREIGN PATENT DOCUMENTS

| | | |
|---|---|---|
| JP | 2006-327423 A | 12/2006 |
| JP | 2009-274679 A | 11/2009 |

\* cited by examiner

*Primary Examiner* — Thomas Tarcza
*Assistant Examiner* — Alex C Dunn
(74) *Attorney, Agent, or Firm* — Mintz Levin Cohn Ferris Glovsky and Popeo, P.C.; Peter F. Corless

(57) ABSTRACT

A method and a system of heating a cabin of a hybrid electric vehicle are provided and minimize the operation of a heater and an engine by reducing the demand temperature of coolant taking into account of power of the heater and improve fuel economy accordingly. The method of heating a cabin of a hybrid electric vehicle adjusts temperature of air supplied into the cabin of the vehicle using a heater disposed adjacent to the cabin of the vehicle and coolant supplied from an engine.

20 Claims, 3 Drawing Sheets

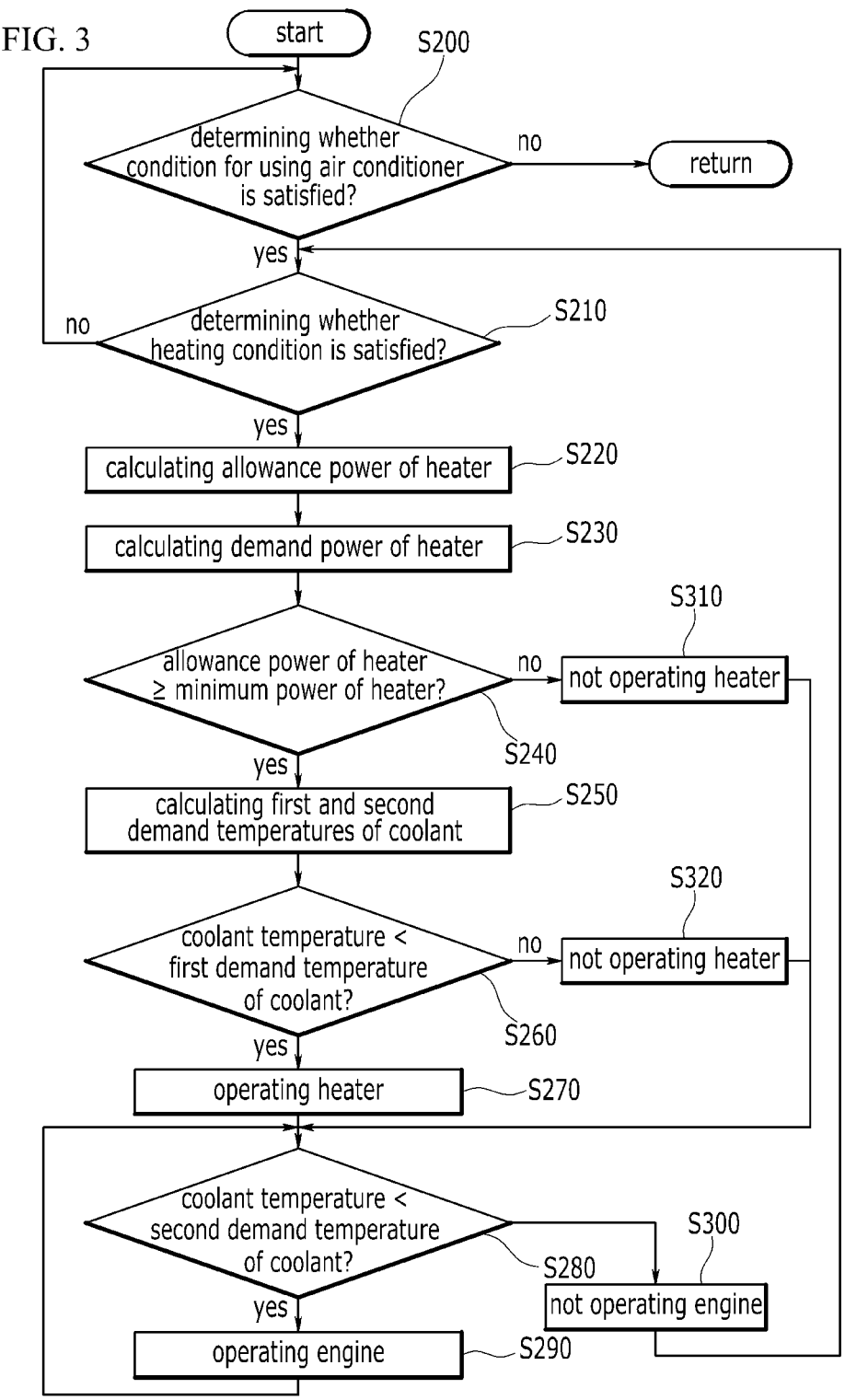

METHOD AND SYSTEM OF HEATING CABIN OF HYBRID ELECTRIC VEHICLE

CROSS-REFERENCE TO RELATED APPLICATION

This application claims priority to and the benefit of Korean Patent Application No. 10-2013-0150696 filed in the Korean Intellectual Property Office on Dec. 5, 2013, the entire contents of which are incorporated herein by reference.

BACKGROUND (a) Field of the Invention

The present invention relates to a method and a system of heating a cabin of a hybrid electric vehicle. More particularly, the present invention relates to a method and a system of heating a cabin of a hybrid electric vehicle that minimizes operation of a heater and an engine by lowering demand temperature of coolant taking into account power of the heater and improves fuel economy accordingly.

(b) Description of the Related Art

Generally, a hybrid electric vehicle (HEV) uses an engine and a motor as power sources. The hybrid electric vehicle enhances fuel economy by providing an electric vehicle (EV) mode when the engine is stopped and the vehicle is driven only by the motor. The hybrid electric vehicle, different from a typical vehicle using fossil fuel such as gasoline or diesel, selectively operates the engine. The engine of a typical vehicle generates power to drive the vehicle as well as power for driving an air conditioner of the vehicle. Particularly, coolant warmed up by the engine to heat a cabin of the vehicle (e.g., the interior of the vehicle) exchanges heat with the air while passing through a heat exchanger disposed near the cabin, and the heated air through heat-exchange with the coolant is supplied into the cabin to heat the interior of the vehicle.

However, since the engine is not always operated in the hybrid electric vehicle, an additional heater for heating the cabin is required. In other words, the air heated through heat-exchange with the coolant is supplied to the cabin of the vehicle during a heating mode of the hybrid electric vehicle, but the heater is operated and heats the air supplied to the cabin of the vehicle when coolant temperature is substantially low. Operation of the heater is controlled only by the coolant temperature according to a conventional hybrid electric vehicle. That is, when the coolant temperature is lower than predetermined temperature, the heater is operated. Therefore, power consumption of the heater increases. When the power consumption of the heater is above a threshold and state of charge (SOC) of a battery is substantially low, the engine is operated to charge the battery. Therefore, fuel consumption may be deteriorated.

The above information disclosed in this section is merely for enhancement of understanding of the background of the invention and therefore it may contain information that does not form the prior art that is already known in this country to a person of ordinary skill in the art.

SUMMARY

The present invention provides a method and a system of heating a cabin of a hybrid electric vehicle having advantages of minimizing operation of a heater and an engine by lowering demand temperature of coolant taking into account power of the heater and improving fuel economy accordingly.

A method of heating a cabin of a hybrid electric vehicle according to an exemplary embodiment of the present invention may adjust temperature of air supplied into the cabin of the vehicle using a heater disposed near the cabin of the vehicle and coolant supplied from an engine.

In particular, method may include: calculating allowance power and demand power of the heater; determining whether the allowance power of the heater is greater than or equal to a minimum power of the heater; calculating a first demand temperature of the coolant that is coolant temperature necessary to currently heat the interior of the vehicle; determining whether the coolant temperature is lower than the first demand temperature of the coolant; and operating the heater when the allowance power of the heater is greater than or equal to the minimum power of the heater and the coolant temperature is lower than the first demand temperature of the coolant.

The allowance power of the heater may be calculated based on a type of a device for supplying electric power to the heater and whether the heater is operated. The allowance power of the heater may be calculated based on maximum allowance power of a low voltage direct current-direct current (DC-DC) converter (LDC), current power consumption of the LDC, current power consumption of the heater, and margin power of the LDC when the device for supplying electric power to the heater is the LDC. The allowance power of the heater may be calculated based on maximum power of a battery management system (BMS), current power consumption of the BMS, current power consumption of the heater, and margin power when the device for supplying electric power to the heater is the BMS.

The heater may be operated with the demand power of the heater. The demand power of the heater may be a minimum value of a difference between demand heat of the cabin and supply heat of the engine and maximum power of the heater. The first demand temperature of the coolant may be determined based on an ambient temperature and demand temperature of the cabin.

The method may further include: calculating a second demand temperature of the coolant that is coolant temperature necessary to currently heat the cabin of the vehicle when the heater is operated; and operating the engine when the allowance power of the heater is greater than or equal to the minimum power of the heater and the coolant temperature is lower than the second demand temperature of the coolant. The second demand temperature of the coolant may be determined based on the first demand temperature of the coolant and temperature according to the demand power of the heater and speed of a blower. The heater may be a positive temperature coefficient (PTC) heater.

A system of heating a cabin of a hybrid electric vehicle according to another exemplary embodiment of the present invention may include: an ambient temperature sensor configured to detect an ambient temperature; a coolant temperature sensor configured to detect coolant temperature; an engine configured to generate power and warm up the coolant; a blower configured to blow air into the cabin of the vehicle; a heater configured to receive electric power from the electric power supply and disposed on a path through which the air may be supplied to the cabin to warm up the air; and a controller configured to adjust temperature of the air supplied to the cabin of the vehicle by operating the engine, the blower, and the heater. The coolant heated by the engine may exchange heat with the air while passing through the path through which the air is supplied to the cabin. In addition, the controller may be configured to operate the heater when allowance power of the heater is greater than or equal to minimum power of the heater and the coolant temperature is lower than first demand temperature of the coolant that is coolant temperature necessary to currently heat the cabin of the vehicle.

The controller may be further configured to calculate the allowance power of the heater based on a type of the electric power supply and whether the heater is operated. The controller may be configured to calculate the allowance power of the heater based on maximum allowance power of an LDC, current power consumption of the LDC, current power consumption of the heater, and margin power of the LDC when the electric power supply is the LDC. The controller may also be configured to calculate the allowance power of the heater based on maximum power of a BMS, current power consumption of the BMS, current power consumption of the heater, and margin power when the electric power supply is the BMS.

Further, the controller may be configured to operate the heater with demand power of the heater. The controller may be configured to calculate a minimum value of a difference between demand heat of the cabin and supply heat of the engine and maximum power of the heater as the demand power of the heater. The controller may be configured to determine the first demand temperature of the coolant based on the ambient temperature and demand temperature of the cabin. The controller may be configured to operate both the heater and the engine when the allowance power of the heater is greater than or equal to the minimum power of the heater and the coolant temperature is lower than second demand temperature of the coolant necessary to currently heat the cabin of the vehicle when the heater is operated. The controller may be configured to determine the second demand temperature of the coolant based on the first demand temperature of the coolant and temperature according to the demand power of the heater and speed of the blower. The heater may be a PTC heater.

BRIEF DESCRIPTION OF THE DRAWINGS

FIG. 3 is an exemplary flowchart of a method of heating a cabin of a hybrid electric vehicle according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
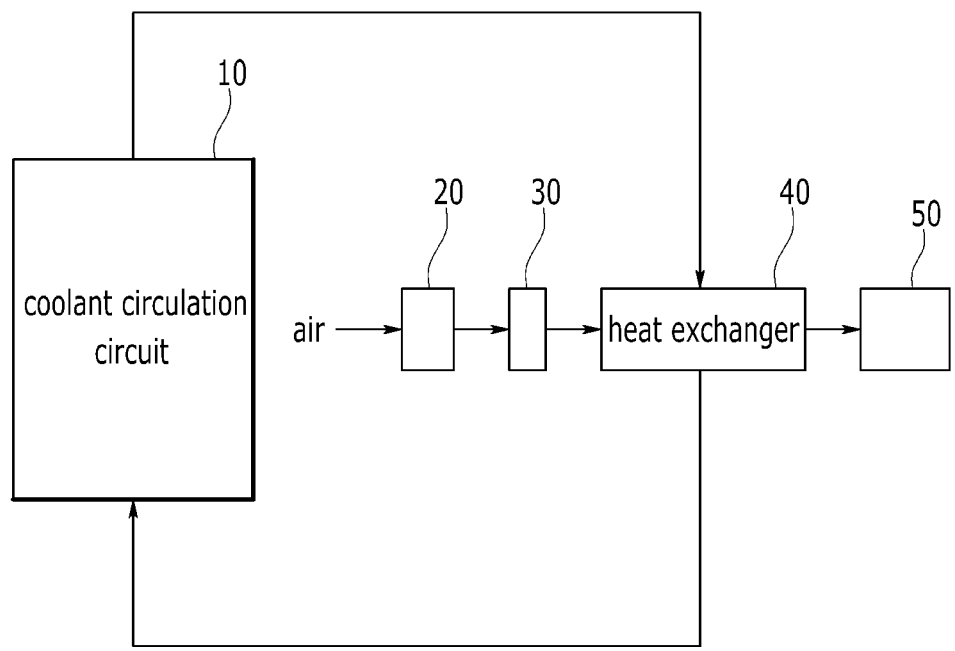
FIG. 1 is an exemplary diagram of an air conditioner for a hybrid electric vehicle according to an exemplary embodiment of the present invention.

An exemplary embodiment of the present invention will hereinafter be described in detail with reference to the accompanying drawings. FIG. 1 is an exemplary diagram of an exemplary air conditioner for a hybrid electric vehicle to which an exemplary embodiment of the present invention may be applied.

As shown in FIG. 1, an exemplary air conditioner for a hybrid electric vehicle to which an exemplary embodiment of the present invention may be applied may include a coolant circulation circuit 10, a blower 20, a heater 30, and a heat exchanger 40. Therefore, air may be supplied into the heat exchanger 40 by the blower 20 and may exchange heat with coolant in the heat exchanger 40. Further, the air may be supplied into a cabin 50 of the vehicle. In addition, the air may be supplied into the heat exchanger 40 after being warmed up by the heater 30 or may be warmed up by the heater 30 after passing through the heat exchanger 40.

Figure 2:
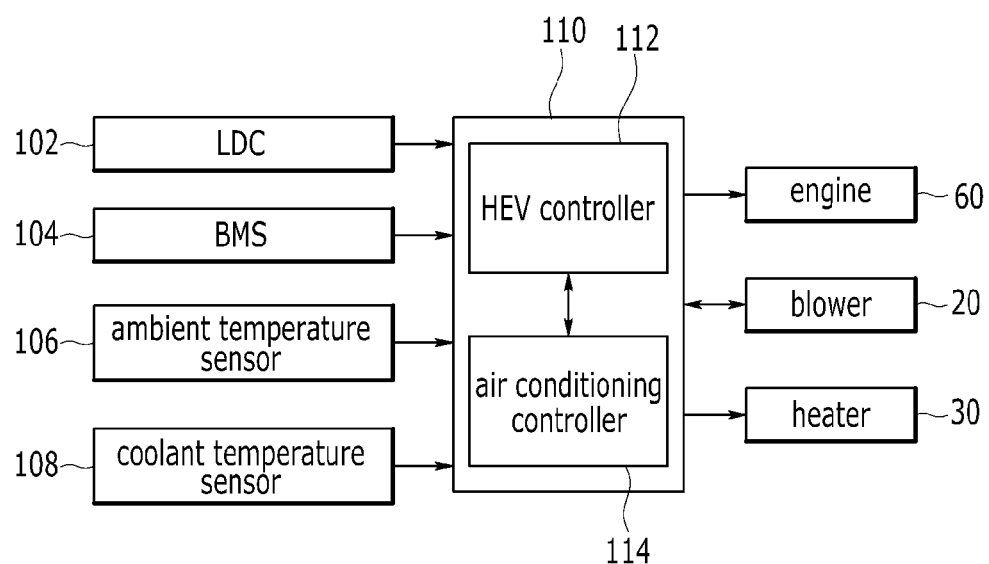
FIG. 2 is an exemplary block diagram of a system of heating a cabin of a hybrid electric vehicle according to an exemplary embodiment of the present invention.

The coolant circulation circuit 10 may be configured to circulate the coolant of the vehicle to cool an engine 60 (referring to FIG. 2). In addition, the coolant circulation circuit 10 may include a coolant supply circuit that supplies the coolant heated by the engine 60 into the heat exchanger 40 and a coolant recovery circuit that receives the coolant passing through the heat exchanger 40 again. The coolant circulation circuit 10 may further include a radiator configured to cool the coolant heated by the engine 60. Furthermore, the coolant circulation circuit 10 may further include a bypass circuit that causes the coolant to bypass the heat exchanger 40 when heating of the cabin 50 is necessary and the engine 60 is not operated. Various devices (e.g., water pump and so on) other than the devices described herein may be used, but description of the various devices will be omitted for convenience of description. In the exemplary embodiment of the present invention, any coolant circulation circuit that may supply the coolant warmed up by the engine 60 into the heat exchanger 40 may be used.

The blower 20 may be configured to supply the air into the cabin 50 of the vehicle. Typically, the blower 20 may be configured to adjust air amount supplied into the cabin 50 of the vehicle by adjusting a rotation speed of a fan. When the rotation speed of the fan is substantially high (e.g., above a predetermined speed), more heat may be necessary to heat the cabin 50 since the amount of air supplied into the cabin 50 of the vehicle increases.

The heater 30 may be disposed on a path through which the air is supplied form the blower 20 into the cabin 50. The heater 30 may be configured to receive electric power from an electric power supply and generate heat. Therefore, the air passing through the heater 30 may be warmed up by the heater. The heater 30 may be mounted at the front or the rear of the heat exchanger 40 and may be disposed near the cabin 50 (e.g., in the vicinity of the cabin or adjacent to the cabin). The heater 30 may be, but not limited to, a positive temperature coefficient (PTC) heater.

The heat exchanger 40 may be disposed on the path through which the air is supplied from the blower 20 into the cabin 50. The heat exchanger 40 may be configured to receive the coolant heated by the engine 60 from the coolant circulation circuit 10 and may be configured to receive the air from the blower 20. The coolant and the air may exchange heat with each other while not being mixed in the heat exchanger. Therefore, the air supplied into the cabin 50 may be warmed up by the heater 30 and/or the heat exchanger 40.

Only the air conditioner of the hybrid electric vehicle related to the exemplary embodiment of the present invention is illustrated in FIG. 1. Therefore, it is to be understood that the exemplary embodiment of the present invention may be applied to various air conditioners of the hybrid electric vehicle as well as the air conditioner illustrated in FIG. 1.

FIG. 2 is an exemplary block diagram of a system of heating a cabin of a hybrid electric vehicle according to an exemplary embodiment of the present invention. As shown in FIG. 2, the system of heating the cabin of the hybrid electric vehicle according to the exemplary embodiment of the present invention may include electric power supplies 102 and 104, an ambient temperature sensor 106, a coolant temperature sensor 108, a controller 110, the engine 60, the blower 20, and the heater 30. The exemplary embodiment of the present invention may include various devices other than the devices illustrated in FIG. 2, but description of the various devices will be omitted for convenience of description.

The electric power supplies 102 and 104 may be configured to supply electric power to the blower 20, the heater 30, and/or other electric components of the vehicle. For these purposes, the electric power supplies 102 and 104 may be connected to a high voltage battery (not shown) of the hybrid electric vehicle, may be configured to convert high voltage of the high voltage battery into low voltage (e.g., decreased voltage), and supply the low voltage to the blower 20, the heater 30, and/or other electric components of the vehicle. It is exemplified in this specification that a low voltage DC-DC converter (LDC) or a battery control system (BMS) may be used as the electric power supplies 102 and 104. In addition, maximum power, margin power, and current power consumption of the electric power supplies 102 and 104 may be detected and transmitted to the controller 110. Further, the maximum power and the margin power of the electric power supplies 102 and 104 may be pre-stored in the controller 110 or the electric power supplies 102 and 104.

The ambient temperature sensor 106 may be configured to detect (e.g., measure) ambient temperature and transmit a signal that corresponds to the ambient temperature to the controller 110. The coolant temperature sensor 108 may be configured to detect (e.g., measure) coolant temperature and transmit a signal that corresponds to the coolant temperature to the controller 110. The coolant temperature may change based on a position where the coolant temperature sensor 108 is mounted. The coolant temperature sensor 108 may be configured to detect the coolant temperature in or in the vicinity of the heat exchanger 40 according to the exemplary embodiment of the present invention.

The controller 110 may include a hybrid-electric vehicle (HEV) controller 112 and an air conditioning controller 114. Various controllers such as an engine controller, a motor controller, and a transmission controller other than the controller 110 illustrated in FIG. 2 may be mounted within the hybrid electric vehicle, but detailed description of the various controllers will be omitted, for convenience of description. In addition, it is exemplified, but is not limited to, in FIG. 2 that the HEV controller 112 and the air conditioning controller 114 are provided in the one controller 110.

The HEV controller 112 may be configured to execute all the operations of the hybrid electric vehicle. For example, the HEV controller 112 may be configured to execute starting of the engine 60 and calculate allowance power and demand power of the heater 30. The air conditioning controller 114 may be configured to operate the air conditioner within the hybrid electric vehicle. For example, the air conditioning controller 114 may be configured to adjust the air amount supplied into the cabin 50 by adjusting the speed of the blower 20, and adjust temperature of the air supplied into the cabin 50 by adjusting the heater 30. The controller 110 may be realized by one or more processors activated by a predetermined program, and the predetermined program may be programmed to perform each step of a method of heating a cabin of a hybrid electric vehicle according to an exemplary embodiment of the present invention.

FIG. 3 is an exemplary flowchart of a method of heating a cabin of a hybrid electric vehicle according to an exemplary embodiment of the present invention. As shown in FIG. 3, the method of heating the cabin of the hybrid electric vehicle according to the exemplary embodiment of the present invention may begin when a condition for using the air conditioner is satisfied. In other words, the controller 110 may be configured to determine whether the condition for using the air conditioner is satisfied at step S200. The condition for using the air conditioner may be satisfied when any occupant of the vehicle turns on the air conditioner.

When the condition for using the air conditioner is not satisfied at the step S200, the process may terminate. When the condition for using the air conditioner is satisfied at the step S200, the controller 110 may be configured to determine whether a heating condition is satisfied at step S210. The heating condition may be satisfied when the ambient temperature is greater than a first predetermined temperature and is less than a second predetermined temperature, and demand temperature of the cabin is greater than a third predetermined temperature and the ambient temperature. When the ambient temperature is less than or equal to the first predetermined temperature or the demand temperature of the cabin is less than or equal to the third predetermined temperature, the engine 60 and the heater 30 may be operated simultaneously. Therefore, other steps of the method may not be executed. In addition, when the ambient temperature is greater than or equal to the predetermined temperature or the demand temperature of the cabin is less than or equal to the ambient temperature, heating the cabin may be unnecessary.

When the heating condition is not satisfied at the step S210, the method may return to the step S200. It is shown in FIG. 3 that the method may return to the step S200, but the controller 110 may return to the step S200 after the engine 60 and the heater 30 are operated or without operating the engine 60 and the heater 30 according to the ambient temperature and the demand temperature of the cabin. When the heating condition is satisfied at the step S210, the controller 110 may be configured to calculate an allowance power of the heater at step S220. The allowance power of the heater 30 may depend on a type of the electric power supply and whether the heater 30 is operated. When the electric power supply is the LDC 102, the allowance power of the heater 30 may be calculated from the following equations (Equations 1 and 2).

Allowance power of heater=maximum allowance power of LDC−current power consumption of LDC−margin power of LDC (when heater is not operated)    Equation 1:

Allowance power of heater=maximum allowance power of LDC−current power consumption of LDC−power consumption of heater−margin power of LDC (when heater is operated)    Equation 2:

When the electric power supply is the BMS 104, the allowance power of the heater 30 is calculated from the following equations (Equations 3 and 4).

Allowance power of heater=maximum power of BMS−current power consumption of BMS−margin power (when heater is not operated)    Equation 3:

Allowance power of heater=maximum power of BMS−current power consumption of BMS−power consumption of heater−margin power (when heater is operated)    Equation 4:

In addition, the controller 110 may be configured to calculate demand power of the heater 30 at step S230. The demand power of the heater 30 may be a minimum value of a difference between demand heat of the cabin and supply heat of the engine and the maximum power of the heater 30. After that, the controller 110 may be configured to determine whether the allowance power of the heater 30 is greater than or equal to minimum power of the heater 30 at step S240. When the allowance power of the heater 30 is greater than or equal to the minimum power of the heater 30, the controller 110 may be configured to calculate first and second demand temperatures of the coolant at step S250.

In particular, the first demand temperature of the coolant may be coolant temperature required to currently heat the cabin 50 of the vehicle, and the second demand temperature of the coolant may be coolant temperature required to currently heat the cabin 50 of the vehicle when the heater is operated. In addition, the first demand temperature of the coolant may be determined based on the ambient temperature and demand temperature of the cabin, and the second demand temperature of the coolant may be determined based on the first demand temperature of the coolant and temperature according to the demand power of the heater 30 and the speed of the blower 20. In other words, the first and second demand temperatures of the coolant may be calculated from the following equations (Equations 5 and 6).

First demand temperature of coolant=$f$(ambient temperature,demand temperature of cabin)    Equation 5:

Second demand temperature of coolant=first demand temperature of coolant−$f$(demand power of heater,speed of blower)    Equation 6:

After the first and second demand temperatures of the coolant are calculated at the step S250, the controller 110 may be configured to determine whether the coolant temperature is less than the first demand temperature of the coolant at step S260. When the coolant temperature is less than the first demand temperature of the coolant at the step S260, the controller 110 may be configured to operate the heater 30 at step S270 since the coolant may not supply sufficient heat to the air supplied into the cabin 50. Further, the controller 110 may be configured to determine whether the coolant temperature is less than the second demand temperature of the coolant at step S280. When the coolant temperature is less than the second demand temperature of the coolant at step S280, the controller 110 may be configured to operate the engine 60 at step S290 since heating the cabin 50 may be insufficient by operating the heater 30 and the method may return to the step S280. When the coolant temperature is greater than or equal to the second demand temperature of the coolant, the controller 110 may not operate the engine 60 at step S300 and the method may return to the step S210.

Meanwhile, when the allowance power of the heater 30 is less than the minimum power of the heater 30 at the step S240, the controller 110 may not operate the heater 30 at step S310 and the method may proceed to the step S280 to determine whether a condition for operating the engine 60 is satisfied. In addition, when the coolant temperature is greater than or equal to the first demand temperature of the coolant at the step S260, the controller 110 may not operate the heater 30 at step S320 since heating the cabin 50 may be possible only by the coolant and the method may proceed to the step S280. In particular, since the coolant temperature is greater than the second demand temperature of the coolant, the method may return to the step S210 after performing the step S300.

As described above, operation of the heater and the engine may be minimized by reducing demand temperature of the coolant in consideration of the allowance power and the demand power of the heater according to the exemplary embodiment of the present invention. In addition, fuel economy may be improved by minimizing operation of the heater and the engine.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:

1. A method of heating a cabin of a vehicle that adjusts temperature of air supplied into the cabin of the vehicle using a heater disposed adjacent to the cabin of the vehicle and coolant supplied from an engine, the method comprising:
   calculating, by a controller, an allowance power and a demand power of the heater;
   determining, by the controller, whether the allowance power of the heater is greater than or equal to a minimum power of the heater;
   calculating, by the controller, a first demand temperature of the coolant that is coolant temperature necessary to currently heat the cabin of the vehicle;
   determining, by the controller, whether the coolant temperature is less than the first demand temperature of the coolant; and
   operating, by the controller, the heater when the allowance power of the heater is greater than or equal to the minimum power of the heater and the coolant temperature is less than the first demand temperature of the coolant.

2. The method of claim 1, wherein the allowance power of the heater is calculated based on a type of a device for supplying electric power to the heater and whether the heater is operated.

3. The method of claim 2, wherein the allowance power of the heater is calculated based on a maximum allowance power of a low voltage direct current-direct current (DC-DC) converter (LDC), current power consumption of the LDC, current power consumption of the heater, and margin power of the LDC when the device for supplying electric power to the heater is the LDC.

4. The method of claim 2, wherein the allowance power of the heater is calculated based on a maximum power of a battery management system (BMS), current power consumption of the BMS, current power consumption of the heater, and margin power when the device for supplying electric power to the heater is the BMS.

5. The method of claim 1, wherein the heater is operated with the demand power of the heater.

6. The method of claim 5, wherein the demand power of the heater is a minimum value of a difference between demand heat of the cabin and supply heat of the engine and maximum power of the heater.

7. The method of claim 1, wherein the first demand temperature of the coolant is determined based on an ambient temperature and a demand temperature of the cabin.

8. The method of claim 1, further comprising:
calculating, by the controller, a second demand temperature of the coolant that is coolant temperature necessary to currently heat the cabin of the vehicle when the heater is operated; and
operating, by the controller, the engine when the allowance power of the heater is greater than or equal to the minimum power of the heater and the coolant temperature is less than the second demand temperature of the coolant.

9. The method of claim 8, wherein the second demand temperature of the coolant is determined based on the first demand temperature of the coolant and temperature according to the demand power of the heater and speed of a blower.

10. The method of claim 1, wherein the heater is a positive temperature coefficient (PTC) heater.

11. A system of heating a cabin of a vehicle comprising:
an electric power supply;
an ambient temperature sensor configured to detect an ambient temperature;
a coolant temperature sensor configured to detect a coolant temperature; and
a controller configured to adjust a temperature of the air supplied to the cabin of the vehicle by operating an engine, a blower, and a heater,
wherein the engine is configured to generate power and warm up a coolant,
wherein the blower is configured to blow air into the cabin of the vehicle,
wherein the heater is configured to receive electric power from the electric power supply and is disposed on a path through which the air is supplied to the cabin to warm up the air,
wherein the coolant warmed up by the engine exchanges heat with the air while passing through the path through which the air is supplied to the cabin, and
wherein the controller is configured to operate the heater when allowance power of the heater is greater than or equal to a minimum power of the heater and the coolant temperature is less than a first demand temperature of the coolant that is coolant temperature necessary to currently heat the cabin of the vehicle.

12. The system of claim 11, wherein the controller is configured to calculate the allowance power of the heater based on a type of the electric power supply and whether the heater is operated.

13. The system of claim 12, wherein the controller is configured to calculate the allowance power of the heater based on maximum allowance power of low voltage direct current-direct current converter (LDC), current power consumption of the LDC, current power consumption of the heater, and margin power of the LDC when the electric power supply is the LDC.

14. The system of claim 12, wherein the controller is configured to calculate the allowance power of the heater based on a maximum power of a battery management system (BMS), current power consumption of the BMS, current power consumption of the heater, and margin power when the electric power supply is the BMS.

15. The system of claim 11, wherein the controller is configured to operate the heater with demand power of the heater.

16. The system of claim 15, wherein the controller is configured to calculate a minimum value of a difference between demand heat of the cabin and supply heat of the engine and maximum power of the heater as the demand power of the heater.

17. The system of claim 11, wherein the controller is configured to determine the first demand temperature of the coolant according to the ambient temperature and demand temperature of the cabin.

18. The system of claim 11, wherein the controller is configured to operate both the heater and the engine when the allowance power of the heater is greater than or equal to the minimum power of the heater and the coolant temperature is less than a second demand temperature of the coolant necessary to currently heat the cabin of the vehicle when the heater is operated.

19. The system of claim 18, wherein the controller is configured to determine the second demand temperature of the coolant based on the first demand temperature of the coolant and temperature according to the demand power of the heater and speed of the blower.

20. A non-transitory computer readable medium containing program instructions executed by a controller, the computer readable medium comprising:
program instructions that calculate an allowance power and a demand power of the heater;
program instructions that determine whether the allowance power of the heater is greater than or equal to a minimum power of the heater;
program instructions that calculate a first demand temperature of the coolant that is coolant temperature necessary to currently heat the cabin of the vehicle;
program instructions that determine whether the coolant temperature is less than the first demand temperature of the coolant; and
program instructions that operate the heater when the allowance power of the heater is greater than or equal to the minimum power of the heater and the coolant temperature is less than the first demand temperature of the coolant.

* * * * *